Oct. 21, 1958 G. VAN B. KING 2,857,553

SPIRAL SWEEP GENERATOR

Filed Feb. 23, 1956 2 Sheets-Sheet 1

INVENTOR.
GORDON VAN B. KING
BY Joseph J. Robbins
ATTORNEY

INVENTOR.
GORDON VAN B. KING
BY
Joseph J. Koblin[signature]
ATTORNEY 2,857,553
SPIRAL SWEEP GENERATOR
Gordon van B. King, Convent, N. J.
Application February 23, 1956, Serial No. 567,236
5 Claims. (Cl. 315—24)

This invention relates to means for generating wave patterns to control deflection of the electron beam in a cathode ray tube and to the means through which the wave patterns exercise control of beam deflection.

The invention provides a generating system with cyclically operating circuit means for modulating applied electrical waves by imposing thereon a predetermined wave form, the form and frequency of the imposed waves being respectively determined by the electrical characteristics and the cyclic frequency of the cyclically operating means. In a more specific aspect, the invention provides for cyclically operating circuit means in the generator to modulate regular sinusoidal input waves by imposing thereon a sawtooth component of lower frequency than the input waves, whereby the generator produces trains of output waves of sinusoidal form, each train within a sawtooth cycle and composed of sinusoidal waves progressively varying in amplitude according to the slope of the sawtooth component.

The invention further provides for utilization of these generated trains of waves as deflection control waves for controlling deflection of the electron beam in a cathode ray tube through a spiral scanning pattern, one for each train of waves and each spiral pattern having a number of revolutions equal to the number of waves in a train, the revolutions approximating circles. The spiral scanning pattern has the advantage of affording equal scanning frequency in coordinate horizontal and vertical directions in contradistinction to the usual zig-zag pattern of a series of high frequency horizontal scans combined with a low frequency vertical scan. Correlative to the equal horizontal and vertical frequencies afforded by the spiral scanning pattern, the invention provides symmetrical horizontal and vertical deflection circuits with like, interchangeable components. According to the invention, the trains of sinusoidal waves of progressively varying amplitude may be used as deflection control voltage waves applied through a phase shifting network to symmetrical coordinate deflection circuits to cause the electron beam in a cathode ray tube to describe a spiral sweep pattern for each applied train of deflection control waves. The spiral scanning pattern and the symmetrical deflection circuits producing it may be used to advantage in preference to the usual zig-zag scanning pattern and unsymmetrical deflection circuits. As an instance, the spiral scanning pattern and symmetrical deflection circuits have been found advantageous for use in place of the zig-zag scanning pattern and associated deflection circuits shown in my copending application Serial No. 335,944, filed February 9, 1953, and dealing with a data processing system.

The type of voltage pattern generated according to the invention may be used with suitable circuitry to deflect the electron beam in cathode ray tubes having either magnetic or electrostatic deflection means; it may be used with display type tubes such as oscilloscopes and flying spot tubes, with camera tubes such as iconoscopes, or with data storage tubes.

The invention provides for recording the desired sequence of voltage variations, or desired voltage pattern, on a magnetically coercive medium such as a magnetic drum, disk, tape, belt, or wire, and which may be played back through suitable amplifying means to control the deflection circuits associated with one or more cathode ray tubes for producing the desired scanning pattern in the tube or tubes. One advantage of first recording the desired voltage pattern on a magnetic medium is that it permits great flexibility in the design and production of the exact wave form desired for a particular use. Another advantage is that once the desired pattern has been magnetically recorded, it can be played back over long periods of time with permanent synchronism between the component wave forms entering into the pattern; specifically, between the sinusoidal and sawtooth components of the pattern. Still another advantage of magnetically recording the voltage pattern is that it permits great flexibility in playback speed, thus affording a simple means for multiplying the voltage frequency.

The invention is featured by a synchronous motor to drive the magnetic medium; specifically, a magnetic drum, during recording of the voltage pattern; by the use of alternating voltage from the same power line supplying the motor as the source of the sinusoidal voltage component entering into the composite voltage pattern; by the use of a potentiometer driven by the synchronous motor as the cyclically operating means for introducing the sawtooth component into the voltage pattern; by the use of symmetrical coordinate, horizontal and vertical deflection circuits for a cathode ray tube; and by the use of a phase shifting network through which the voltage pattern is applied to the coordinate deflection circuits with a phase difference of 90 degrees between the voltage applied by the phase shifting network to the horizontal deflection circuit and the voltage applied by the network to the vertical deflection circuit, whereby the electron beam in the cathode ray tube is directed through a spiral scanning pattern.

Other objects and advantages of the invention will appear from the detailed description, the claims, and the drawings.

Figure 1:
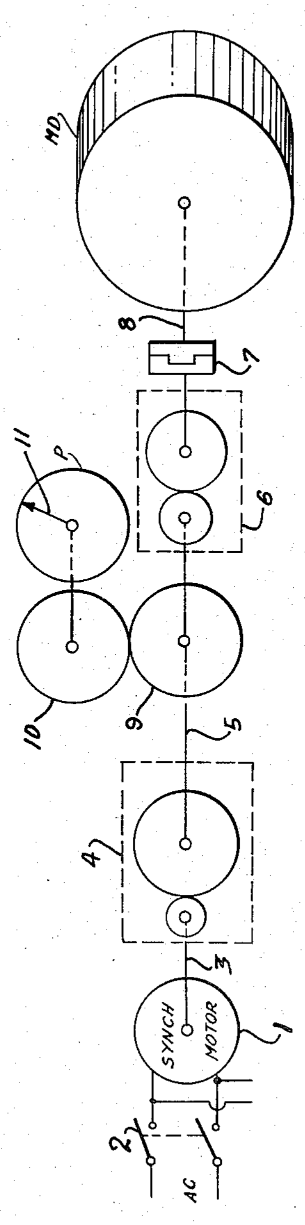
Fig. 1 is a schematic showing of a typical mechanical layout of the parts of the generator.

Referring to Fig. 1, a synchronous motor 1 receives electrical power from an alternating, sinusoidal voltage supply line AC when a switch 2 is closed. Motor shaft 3 drives a gear reduction unit 4. The outgoing shaft 5 of the gear reduction unit 4 drives a second, optionally employed gear reduction unit 6 which, through an optional clutch 7 rotates shaft 8 of a magnetic drum designated MD. Fixed on the shaft 5 of the gear reduction unit 4 is a gear 9 which meshes with a gear 10 on the shaft of slider or wiper arm 11 of a potentiometer generally designated P.

Figure 2:
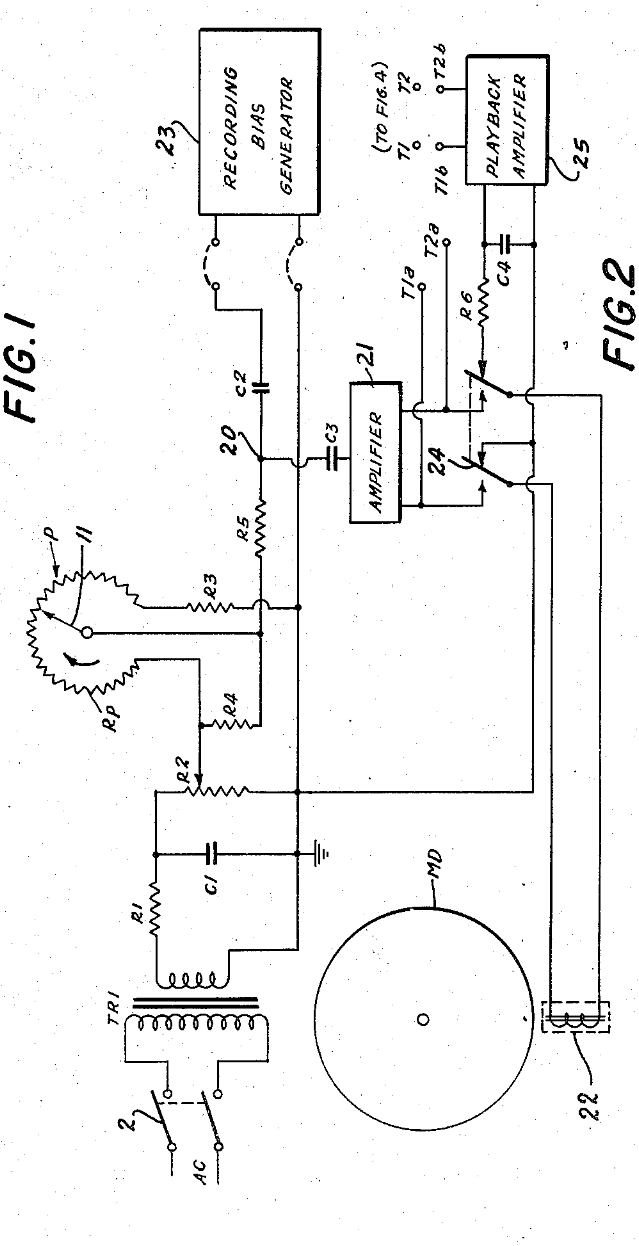
Fig. 2 is a schematic wiring diagram of the circuit connections between parts of the generator.

It will be brought out in the description of Fig. 2 that the voltage pattern generated, and recorded on drum MD, is the result of equal amplitude sinusoidal waves originating on line AC being modulated by a sawtooth wave form imposed by the potentiometer P during a revolution of its arm 11. Each revolution of the potentiometer arm defines a sawtooth cycle. The ratio of sinusoidal frequency to sawtooth frequency is the ratio of alternating voltage frequency on line AC to the rotational frequency of the potentiometer arm. Unit 4 principally determines this ratio. Assume, for example, that the motor 1 is a 4-pole motor and that the alternating voltage frequency is 60 cycles per second. Motor 1 therefore rotates at 30 revolutions per second. Assuming that the gears 9 and 10 are of the same diameter, if the gear reduction unit 4 has a ratio of 7½ to 1, the potentiometer arm rotates at the rate of 4 revolutions per second. In this interval, 60 sinusoidal waves appear on line AC; hence, the ratio of sinusoidal to sawtooth frequency is 15 to 1, and 15 sinusoidal waves occur during one sawtooth cycle. During each sawtooth cycle, one complete voltage pattern may be magnetically simulated on the magnetic drum MD. Gear reduction unit 6 determines the ratio of potentiometer cycles per revolution of the drum and, hence, the number of complete voltage patterns which can be tracked along one full circle of the drum. For example, if unit 6 has a 4 to 1 ratio, the drum will make one turn while the potentiometer performs four cycles; therefore, four complete patterns of voltage will be recorded along one circle of the drum. Obviously, to avoid recording of an incomplete pattern on the drum, the number of potentiometer cycles per drum turn must be an integral number. If only one pattern per drum turn is required, the gear reduction unit 6 may be omitted and the drum driven one-to-one with the potentiometer arm by the gear reduction unit 4.

Each voltage pattern recorded on the drum MD will give rise during playback operation to one spiral scanning raster or pattern (Fig. 5) in which the number of revolutions or scan lines of the scanning trace equals the number of sinusoidal cycles per voltage pattern. Hence, the speed of the drum during playback determines the raster frequency and the scan line frequency. For instance, if there are 4 voltage patterns in a drum circle, each with 15 sinusoidal cycles, and the drum makes one revolution per second during playback, the raster frequency is 4 per second and the scan line frequency is 60 per second. This scan line frequency is the same as the frequency at which the sinusoidal cycles are recorded on the drum when the line AC supplies 60 cycle alternating voltage.

In many cases, it is desirable to have a scan line frequency much greater than 60 per second. This is readily obtainable by use of suitable drive mechanisms for revolving the drum at relatively low speed during recording and at high speed during playback. For example, if the unit 4 has a reduction ratio of 15:1, unit 6 a reduction ratio of 10:1, and motor 1 is driven at 30 revolutions per second by 60 cycle power on line AC, then the potentiometer arm 11 will make 2 revolutions per second while the drum makes one-fifth of a revolution per second. The ratio of potentiometer turns to drum turn is, therefore, 10 to 1, and 10 complete patterns are recorded along a drum circle. The sinusoidal frequency during recording is the 60 cycle frequency on line AC and since the potentiometer arm makes 2 revolutions a second, 30 sinusoidal cycles are recorded per sawtooth cycle and a total of 300 sinusoidal cycles is contained in the 10 voltage patterns applied to the drum circle. During playback, the drum may be run, for instance, at 60 revolutions per second, thus providing a raster frequency of 600 per second and a scanning frequency of 18,000 scan lines per second. In other words, the input frequency of 60 sinusoidal cycles per second to the drum has been multiplied 300 times during playback to produce an output frequency of 18,000 sinusoidal cycles per second. The limitation on frequency multiplication is set by the recording requirement of sufficient speed of the drum periphery, or magnetizable surface, to enable the 60 cycle sinusoidal waves to be satisfactorily impressed magnetically. A surface speed of about 5 inches per second is taken as a desirable minimum speed during recording.

Figures 3, 4, 5:
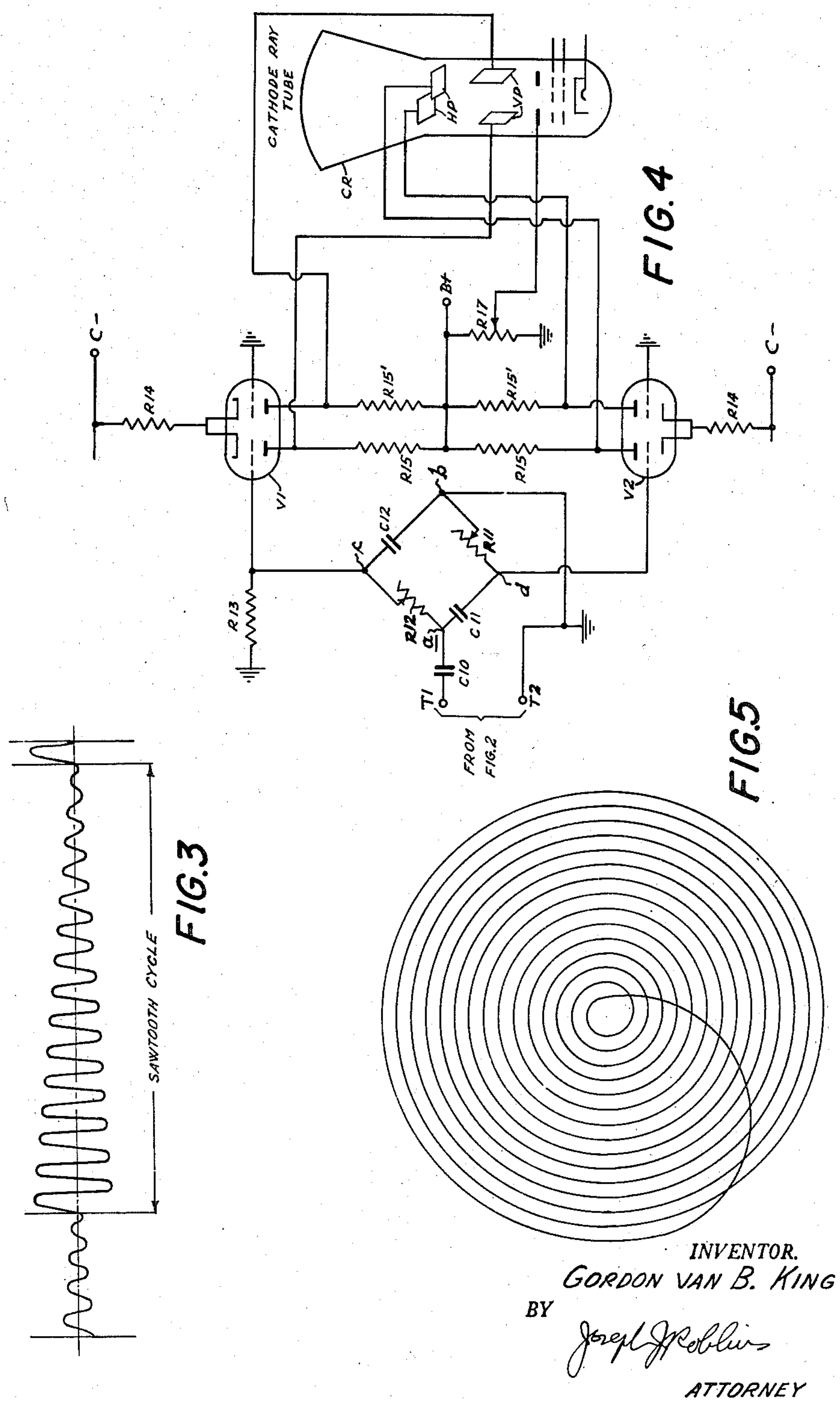
Fig. 3 shows the form of generated deflection control voltage.
Fig. 4 shows the circuit of the deflection system for a cathode ray tube to which the generated voltage pattern may be applied to produce a spiral sweep pattern.
Fig. 5 shows the form of spiral sweep pattern produced.

Numerous variations of the basic arrangement shown in Fig. 3 are possible. Gear reduction unit 6 may be omitted and its function taken over by the gearing between unit 4 and the potentiometer. For instance, if gear 10 were one-fifth the diameter of gear 9, the potentiometer arm would turn at five times the rate of the magnetic drum, assuming the drum were receiving drive directly from shaft 5 of unit 4. The clutch 7 is desirable to permit the drum to be disconnected following recording. The drum can then be driven at higher speed for playback, either by motor 1 through a different transmission than shown or by another motor.

In Fig. 2, line AC and switch 2 are the same as in Fig. 1 for applying power to synchronous motor 1, though a separate switch may be used. The sinusoidal voltage on line AC is applied to a suitable step-down transformer TR1 upon closure of switch 2. The secondary of the transformer supplies the sinusoidal voltage to the potentiometer P through a resistor R1 and a voltage divider R2. A capacitor C1 combines with R1 to form a filter capable of improving the wave form of the transformer output. R2 affords means to adjust the maximum input signal voltage, that is, the maximum amplitude of the sine waves to be transmitted from the secondary circuit of the transformer to the amplitude modulating means. The amplitude modulating means comprises the potentiometer P. Voltage from the slider of R2 goes through resistive element R*p* of the potentiometer and thence via a resistor R3 to ground. The relative values of R*p* and R3 determine the degree of modulation effected. If the maximum modulated, output signal voltage is to be, say, 20 times the minimum, R*p* and R3 are chosen so that the resistance of R*p* to that of R3 will be 19 to 1. A resistor R4 is connected between the slider of R2 and a resistor R5 which leads to output point 20. The value of R4 governs the base voltage level during the interval in which the potentiometer arm 11 is traversing the gap between the ends of *Rp*. If the base voltage level, at the point 20, is to be zero, R4 will be disconnected from the slider of R2 and connected instead to ground. In either case, the value of R4 should be high compared to the values of R*p* and R3 to avoid distortion of the sawtooth form. Typical values are R4–1000 ohms, R*p*–100 ohms, and R3–5 ohms.

Since potentiometer P is used only during generation of the modulated sinusoidal voltage and its recording on the magnetic drum and may remain idle during playback, the potentiometer may be a low-priced commercial unit such as a molded composition 2-watt unit modified by removal of any shaft limit stops so as to leave the potentiometer arm free to rotate continuously.

During each revolution of the potentiometer in the indicated direction, it progressively increases the proportion of R*p* and R3 resistance interposed between the slider of R2 and the resistor R5. The effect is to impose a declining sawtooth modulation upon the voltage waves passed to point 20, with a resulting pattern of modulated voltage such as indicated in Fig. 3. Obviously, by rotating the potentiometer arm or slider 11 in the reverse direction, an ascending modulation of sawtooth form could be imposed on the input signal. Also, instead of providing a resistive element R*p* with linear resistive characteristics, one having a different resistance gradient may be used. Thus, a potentiometer providing a logarithmically tapering resistance gradient or a resistance gradient varying according to any other desired mathematical law may be used. Also, a combination of various potentiometers may be used in series, the output circuit of one serving as the input circuit to the next. Thus, any of various modulating wave forms may be imposed cyclically on the applied alternating signal, whereby almost any desired resultant form of output signal may be obtained.

The resultant, modulated output signal appearing at the point 20 (Fig. 2) may be applied directly to a utilization device via a capacitor C3, an amplifier 21, and plugging from terminals T1*a* and T2*a* to output terminals T1 and T2 of the generator, and thence to the input terminals of the utilization device. It is preferred, however, in view of the advantages explained before, to impress the generated voltage pattern magnetically on a magnetic medium, such as the drum MD, from which derived voltages corresponding to the recorded pattern may be transmitted to the utilization device through a playback circuit. The circuitry required to magnetically record the generated voltage pattern upon the drum MD depends on the type of record-playback head which is used. If a head designed for handling speech and music is used, any commercial tape recorder amplifier would be sufficient between output point 20 of the generator and the magnetic pickup head. Such commercial units are equipped with a recording bias generator and switching means for selecting recording or playback operation. It is preferred, however, to use a record-playback head 22 of the very low impedance type such as handle voltage pulses in electronic computers. For effectively driving such low impedance head, an amplifier having greater power than the usual tape recorder amplifier is employed, along with a separate source of high frequency bias. The higher power amplifier is represented in Fig. 2 by the block 21 and the source of high frequency bias by the block 23 marked Recording Bias Generator. The unit 23 may be a conventional audio oscillator with an output signal of at least 10 volts R. M. S. Resistor R5 and a capacitor C2 couple the modulating circuit and the recording bias generator to the common point 20 from which the resulting signal is transmitted via C3 to the amplifier 21. The output of the amplifier, reflecting the applied signal, is transmitted via a double pole, double throw switch 24 when the switch is in "record" position, reverse to that shown, to the record-playback head 22, causing the signal pattern to be recorded on the magnetic drum MD. Amplifier 21 may be of the type having transformer output with an impedance of 4 or 8 ohms. Good results have been obtained by using a 30 watt audio amplifier with output taken from the 8 ohm terminals to furnish the recording signal to a Brush type 1605 head coacting with a magnetic drum having a standard red oxide coating.

Switch 24 is shown in "playback" position. After the desired voltage pattern has been recorded on the drum MD, it may be disconnected from the drive mechanism shown in Fig. 1 and driven by other means, as explained before, for playback. Preparatory to playback, the switch 24 will be thrown from "record" position to the shown "playback" position. The head 22 will then be in circuit with the playback amplifier 25, the output terminals T1*b* and T2*b* of which may be plugged to the final output terminals T1 and T2. A resistor R6 and a capacitor C4 form a filter to smooth out the playback wave form and reduce the high frequency noise produced by the magnetic drum.

Fig. 3 shows the declining sawtooth modulated pattern produced when the arm 11 of a potentiometer having a linearly sloping resistance gradient is rotated at 4 R. P. S. to modulate 60 cycle alternating voltage originating on line AC. The 15 to 1 ratio between the supply voltage frequency and the rotational frequency of the potentiometer results in the production of 15 amplitude-modulated sinusoidal waves in each pattern. This pattern will be magnetically simulated on the magnetic drum, in the manner described, and subsequently reflected during playback operation as a voltage pattern on output terminals T1 and T2. From there, the voltage pattern will be recurrently transmitted via suitable connections to the input terminals, also designated T1 and T2, of deflection circuits shown in Fig. 4. Input terminal T2 is grounded and the voltage with respect to ground is applied via a coupling capacitor C10 to point *a* of a phase shifting network consisting of capacitors C11 and C12 and resistors R11 and R12. Point *b* of the network goes to ground. Points *c* and *d* of the network are its output points, and the voltage waves appearing at one of these output points are shifted by the network 90 degrees out of phase with the waves appearing at the other output point. R11 and R12 are variable resistors affording means whereby the voltage waves at points *c* and *d* may be equalized in amplitude at the required phase difference of 90 degrees. Points *c* and *d* connect, respectively, to the grids in the left halves of like dual triode tubes V1 and V2 in symmetrical vertical and horizontal deflection circuits, respectively. R13 is a conventional grid resistor to ground for the left half of V1; R11 serves as a corresponding grid resistor for the left half of V2. To indicate that V1 and V2 are in identical symmetrical circuits, the corresponding anode and cathode resistors of V1 and V2 are identified by the same reference designations.

The two cathodes in each of V1 and V2 have a common cathode resistor R14 terminating at a negative voltage line C−. The anodes V1 and V2 are supplied with voltage via resistors R15 and R15' from a B+ supply line. The anode lines of V1 connect to vertical deflection plates VP of a cathode ray tube CR, while the anode lines of V2 connect to horizontal deflection plates HP. Each of the tubes V1 and V2 is thus connected as a conventional phase inverter to furnish push-pull deflection potentials in response to the phase-shifted control voltage applied to the input grid of the tube. The coordinate deflection potentials furnished by V1 and V2 mirror the applied control voltages and hence consist of sinusoidal waves of progressively decreasing amplitude during each scanning cycle, consistent in duration with a sawtooth cycle. Due to the sinusoidal wave form of the coordinate deflection potentials and their phase difference of 90°, the electron beam in the tube CR and its trace on the face of the tube have a rotary motion. The trace motion would be completely circular were it not for the progressive decrease in amplitude of the deflection potentials during the scanning cycle. Because of this progressive decrease, the radius of the trace diminishes during the scanning cycle so that the trace describes a decreasing spiral scanning pattern or raster of the form shown in Fig. 5. During each scanning cycle, the deflection potential amplitude decreases from a maximum sufficient to cause the trace to describe the outer revolution of the raster to a minimum value and then returns rapidly to maximum value to start a new raster at the beginning of the next cycle. Each pair of coordinately acting deflection voltage waves is responsible for one revolution of the raster. Hence, with 15 voltage waves per sawtooth cycle (Fig. 3) supplied to the deflection circuits, the 15 corresponding waves of deflection potential supplied by these circuits to the deflection plates result in a raster with fifteen revolutions.

The potentiometer R17 between the B+ line and ground is an astigmatism control for setting the final anode of the cathode ray tube at the average potential level of the deflection plates so that the trace will be sharp, of minimum size, in all parts of the raster. The sources of voltages, other than those shown, required for operation of the cathode ray tube are entirely conventional and need not be shown.

While there have been shown and described the fundamental novel features of the invention as applied to a preferred embodiment, it is understood that various substitutions and changes in the form and details of the device illustrated and in its mode of operation may be made by those skilled in the art, without departing from the spirit of the invention. It is intended, therefore, to be limited only as indicated by the following claims.

I claim:

1. In a signal generator; an alternating current source an input line for deriving from said source an alternating wave form input signal to be modulated, an output line for the modulated signal, and amplitude modulating means including a cyclically operating potentiometer having its resistive element and slider in series connection between the input and output lines to receive the input signal, impose thereon during each traverse of the resistive element by the slider an amplitude modulating component of wave form dependent on the resistance gradient of the potentiometer, and to apply the resulting modulated signal pattern to the output line, and a synchronous electric motor powered by said source for continually actuating the slider through successive cycles of traverse of the resistive element at a synchronized submultiple cyclic frequency of the alternating wave frequency of the input signal.

2. In a signal generator as defined in claim 2, a magnetically coercive medium driven by the motor in timed relation to the potentiometer cycles, a magnetic pickup head for said medium, and a recording circuit coupled to said output line for applying the modulated signal patterns formed during successive potentiometer cycles to the pickup head to effect magnetic recording of the modulated signal upon said medium.

3. In a signal generator; a power line carrying sinusoidal cycle voltage, a circuit powered by said line to provide a similar sinusoidal cycle input signal to be modulated, an output circuit for the modulated signal, and amplitude modulating means including a potentiometer having its resistive element and slider in series connection between said circuits to receive the input signal, modulate it, and impress the modulated signal upon the output circuit, said resistive element having a substantially linear resistance gradient so as to coact with the silder upon each traverse thereof by the slider to impose a modulating component of sawtooth form upon the input signal, a synchronous motor powered by said line, drive connections from the motor to the slider to actuate the slider continually through successive cycles of traverse of the resistive element in synchronized submultiple frequency ratio to the sinusoidal cycle frequency of the input signal, whereby the modulating sawtooth form is cyclically imposed upon like series of sinusoidal cycles to produce repeat patterns of sinusoidal cycles of progressively varying amplitude within each pattern.

4. The invention as defined in claim 3, the potentiometer being of the rotary type having its slider continuously rotated by the motor to traverse the resistive element from one end to the other and return to the former end during each revolution, and impedance means across the slider and said former end of the resistive element to establish the voltage level of the modulated signal during the interval of slider movement across the gap between said ends.

5. The invention according to claim 3, including a magnetically coercive rotatable medium, a transmission between the motor and the medium for driving the medium in integral submultiple ratio to the cycles of the slider, and a magnetic recording circuit coupled to said output circuit to magnetically record upon a single circular track of the medium a number of identical, complete signal patterns dependent on said submultiple ratio.

References Cited in the file of this patent

UNITED STATES PATENTS

| | | |
|---|---|---|
| 2,400,791 | Tolson et al. | May 21, 1946 |
| 2,411,030 | De Ryder | Nov. 12, 1946 |
| 2,618,764 | Reiber | Nov. 18, 1952 |
| 2,656,407 | Herrick et al. | Oct. 20, 1953 |
| 2,660,709 | Hampshire et al. | Nov. 24, 1953 |
| 2,730,699 | Gratian | Jan. 10, 1956 |